(12) United States Patent
Cowman-Eggert et al.

(10) Patent No.: US 10,259,194 B2
(45) Date of Patent: Apr. 16, 2019

(54) MOUNTING SYSTEM

(71) Applicant: 3M INNOVATIVE PROPERTIES COMPANY, St. Paul, MN (US)

(72) Inventors: Christina D. Cowman-Eggert, South Saint Paul, MN (US); David J. Prince, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/559,154

(22) PCT Filed: Mar. 9, 2016

(86) PCT No.: PCT/US2016/021469
§ 371 (c)(1),
(2) Date: Sep. 18, 2017

(87) PCT Pub. No.: WO2016/148992
PCT Pub. Date: Sep. 22, 2016

(65) Prior Publication Data
US 2018/0065338 A1 Mar. 8, 2018

Related U.S. Application Data

(60) Provisional application No. 62/134,722, filed on Mar. 18, 2015, provisional application No. 62/213,765, filed on Sep. 3, 2015.

(51) Int. Cl.
*B32B 7/00* (2019.01)
*B32B 7/06* (2019.01)
(Continued)

(52) U.S. Cl.
CPC .............. *B32B 7/06* (2013.01); *A47G 1/1606* (2013.01); *B32B 3/30* (2013.01); *B32B 5/18* (2013.01); *B32B 7/04* (2013.01); *B32B 7/08* (2013.01); *B32B 7/12* (2013.01); *B32B 27/065* (2013.01); *F16M 13/02* (2013.01); *B32B 27/06* (2013.01); *B32B 27/08* (2013.01); *B32B 2250/40* (2013.01); *B32B 2250/44* (2013.01); *B32B 2266/0214* (2013.01); *B32B 2307/51* (2013.01); *B32B 2307/514* (2013.01); *B32B 2307/542* (2013.01); *B32B 2307/732* (2013.01); *B32B 2307/748* (2013.01); *B32B 2405/00* (2013.01)

(58) Field of Classification Search
CPC .. F16B 47/003; F16B 2001/0028; A47G 1/17; A47G 1/175
USPC ..................... 248/466, 467, 205.3
See application file for complete search history.

(56) References Cited

U.S. PATENT DOCUMENTS 3,353,663 A  11/1967 Kayser
3,408,705 A  11/1968 Kayser
(Continued)

FOREIGN PATENT DOCUMENTS

WO  WO 1999-31193   6/1999
WO  WO 2015-195344  12/2015

OTHER PUBLICATIONS

International Search Report for PCT International Application No. PCT/US2016/21469, dated May 20, 2016, 3 pages.

*Primary Examiner* — Steven M Marsh
(74) *Attorney, Agent, or Firm* — Kevin W. Weber

(57) ABSTRACT

The present disclosure generally relates to a mounting system capable of affixing an object to a wall or vertical surface.

18 Claims, 5 Drawing Sheets

(51) Int. Cl.
  *B32B 5/18*   (2006.01)
  *B32B 7/12*   (2006.01)
  *B32B 27/06*  (2006.01)
  *B32B 3/30*   (2006.01)
  *A47G 1/16*   (2006.01)
  *F16M 13/02*  (2006.01)
  *B32B 7/04*   (2019.01)
  *B32B 7/08*   (2019.01)
  *B32B 27/08*  (2006.01)

(56) References Cited

U.S. PATENT DOCUMENTS

| | | |
|---|---|---|
| 3,471,903 A | 10/1969 | Northrup |
| 4,120,718 A | 10/1978 | Hudalla |
| 4,216,257 A | 8/1980 | Schams |
| 4,223,067 A | 9/1980 | Levens |
| 4,290,832 A | 9/1981 | Kalleberg |
| 4,310,137 A | 1/1982 | Frye |
| 4,322,875 A | 4/1982 | Brown |
| 4,391,687 A | 7/1983 | Vesley |
| 4,415,615 A | 11/1983 | Esmay |
| 4,454,183 A | 6/1984 | Wollman |
| 4,563,388 A | 1/1986 | Bonk |
| 4,679,851 A | 7/1987 | Solie |
| 4,699,622 A | 10/1987 | Toussant |
| 4,776,636 A | 10/1988 | Pyle |
| 4,819,309 A | 4/1989 | Behymer |
| 4,887,339 A | 12/1989 | Bellanger |
| 4,894,060 A | 1/1990 | Nestegard |
| 4,910,062 A | 3/1990 | Zinke |
| 4,942,071 A * | 7/1990 | Frye .................. B32B 27/06 428/40.6 |
| 4,977,003 A | 12/1990 | Brown |
| 4,985,488 A | 1/1991 | Landin |
| 5,024,880 A | 6/1991 | Veasley |
| 5,040,275 A | 8/1991 | Eckhardt |
| 5,077,870 A | 1/1992 | Melbye |
| 5,135,598 A | 8/1992 | Kobe |
| 5,145,929 A | 9/1992 | Ou-Yang |
| 5,149,573 A | 9/1992 | Kobe |
| 5,308,428 A | 5/1994 | Simpson |
| 5,312,387 A | 5/1994 | Rossini |
| 5,344,691 A | 9/1994 | Hanschen |
| 5,399,219 A | 3/1995 | Roessler |
| 5,453,319 A | 9/1995 | Gobran |
| 5,487,809 A | 1/1996 | Goulait |
| 5,537,722 A | 7/1996 | Niederhofer |
| 5,554,146 A | 9/1996 | Niederhofer |
| 5,598,610 A | 2/1997 | Torigoe |
| 5,602,221 A | 2/1997 | Bennett |
| 5,605,729 A | 2/1997 | Mody |
| 5,614,232 A | 3/1997 | Torigoe |
| 5,625,929 A | 5/1997 | Hattori |
| 5,654,487 A | 8/1997 | Cooley |
| 5,671,511 A | 9/1997 | Hattori |
| 5,671,512 A | 9/1997 | Hattori |
| 5,679,302 A | 10/1997 | Miller |
| 5,691,021 A | 11/1997 | Kobe |
| 5,691,027 A | 11/1997 | Eckhardt |
| 5,705,013 A | 1/1998 | Nease |
| 5,713,111 A | 2/1998 | Hattori |
| 5,719,247 A | 2/1998 | Delgado |
| 5,759,317 A | 6/1998 | Justmann |
| 5,851,205 A | 12/1998 | Hisada |
| 5,851,663 A | 12/1998 | Parsons |
| 5,852,855 A | 12/1998 | Mody |
| 5,908,695 A | 6/1999 | Kobe |
| 5,957,908 A | 9/1999 | Kline |
| 5,985,081 A | 11/1999 | Reynolds |
| 6,030,373 A | 2/2000 | VanGompel |
| 6,051,094 A | 4/2000 | Melbye |
| 6,075,179 A | 6/2000 | McCormack |
| 6,076,238 A | 6/2000 | Arsenault |
| 6,086,973 A | 7/2000 | Hazes |
| 6,120,867 A | 9/2000 | Hamerski |
| 6,190,758 B1 | 2/2001 | Stopper |
| 6,406,468 B1 | 6/2002 | Dilnik |
| 6,470,540 B2 | 10/2002 | Aamodt |
| 6,544,245 B2 | 4/2003 | Neeb |
| 6,572,945 B2 | 6/2003 | Bries |
| 6,575,953 B2 | 6/2003 | Olson |
| 6,588,074 B2 | 7/2003 | Galkiewicz |
| 6,592,800 B1 | 7/2003 | Levitt |
| 6,630,239 B2 | 10/2003 | Cernohous |
| 6,692,807 B2 | 2/2004 | Bries |
| 6,874,777 B2 | 4/2005 | Sano |
| 7,032,278 B2 | 4/2006 | Kurtz, Jr. |
| 7,125,400 B2 | 10/2006 | Igaue |
| 7,140,774 B2 | 11/2006 | Galkiewicz |
| 7,217,455 B2 | 5/2007 | Valdez |
| 7,361,246 B2 | 4/2008 | Chang |
| 7,371,302 B2 | 5/2008 | Miyamoto |
| 7,517,572 B2 | 4/2009 | Van Dyke |
| 7,578,812 B2 | 8/2009 | Datta |
| 7,594,636 B2 * | 9/2009 | Wong .................. A47G 1/20 248/205.3 |
| 7,605,212 B2 | 10/2009 | Dollase |
| 7,658,813 B2 | 2/2010 | Peterson |
| 7,703,179 B2 | 4/2010 | Ferguson |
| 7,879,441 B2 | 2/2011 | Gehlsen |
| 8,277,922 B2 | 10/2012 | Tuman |
| 8,777,919 B2 | 7/2014 | Kimura |
| 8,814,124 B1 * | 8/2014 | Vayntraub ............ A47G 1/1606 248/477 |
| 9,920,783 B2 * | 3/2018 | Runge .................. F16B 11/006 |
| 2003/0161984 A1 | 8/2003 | Bries |
| 2003/0173481 A1 * | 9/2003 | Tatta .................. G09F 3/20 248/205.3 |
| 2004/0010217 A1 | 1/2004 | Blette |
| 2005/0006552 A1 * | 1/2005 | Giles .................. A47G 1/168 248/467 |
| 2006/0249870 A1 | 11/2006 | Tachauer |
| 2010/0206377 A1 | 8/2010 | Sahlin |
| 2011/0179549 A1 | 7/2011 | Zaggl |
| 2011/0250375 A1 | 10/2011 | Bries |
| 2013/0056597 A1 | 3/2013 | Boelstler |

* cited by examiner

MOUNTING SYSTEM

CROSS REFERENCE TO RELATED APPLICATIONS

This application is a national stage filing under 35 U.S.C. 371 of PCT/US2016/021469, filed Mar. 9, 2016, which claims the benefit of provisional Application No. 62/134,722, filed Mar. 18, 2015, and provisional Application No. 62/213,765, filed Sep. 3, 2015, the disclosures of which is incorporated by reference in their entirety herein.

TECHNICAL FIELD

The present disclosure generally relates to a mounting system capable of affixing an object to a wall or vertical surface.

BACKGROUND

Easel back picture or photo frames include a support structure attached to the back of the picture or photo frame that holds the frame upright. When used with photo or picture frames, the easel back facilitates vertical display of the photo or picture frame, often at an angle of about 20° to the vertical.

An exemplary schematic drawing of an easel back photo frame, viewed from the back, is shown in FIG. 1. Easel back photo frame 100 includes frame portion 110 and easel back or easel stand portion 120. Easel back portion 120 is connected to frame portion 110 by a hinge 130.

SUMMARY

The inventors of the present disclosure recognized that easel backs or stands on picture or photo frames often prevent the picture or photo frame from being securely attached or adhered relatively flush to a wall using the attachment mechanisms provided on the frame (e.g., keyhole, sawtooth, etc). This is because the easel back or easel stand portion has a thickness that can be greater than the thickness of the nail or attachment device. Additionally, the easel backs or easel stands have a thickness that can make effective use of 3M™ COMMAND™ Picture Hanging Strips challenging. This is because the thickness of the easel back or easel stand can be similar to or greater than the thickness of the 3M™ COMMAND™ Picture Hanging Strip. These issues can be resolved by removal of the easel back or easel stand, but removal of the easel stands or backs is challenging, time-consuming, and can impair or destroy the frame.

Additionally, the inventors of the present disclosure recognized that a trend in home design is to hang various wall decorations overlapping with one another such that at least some of them are hung at varying distances from the wall or vertical surface. Two examples of such wall displays are provided in FIGS. 2a and 2b.

To address at least some of these problems, the inventors of the present disclosure invented improved picture hanging strip/mounting systems having an increased thickness. In some embodiments, the picture hanging strips/mounting systems mount, hang, or affix objects (including, for example, easel back picture or photo frames) flush and/or adjacent to a wall or vertical surface without requiring removal of the easel stand or easel back. In some embodiments, the picture hanging strips/mounting systems mount, hang, or affix objects (including, for example, easel back picture or photo frames) to a wall or vertical surface at a desired distance or depth from the wall or vertical surface. For example, in some embodiments, the user can select a third connector having a desired thickness to facilitate the depth at which the user desires the object to be spaced from the wall or vertical surface when hung, attached, or mounted. Further, the mounting system embodiments described herein provide damage-free hanging.

Some embodiments relate to a mounting system, comprising: (A) a first adhesive structure comprising: a first backing layer having first and second major surfaces and first and second ends; a first adhesive surface over at least a portion of said first major surface of said first backing layer for bonding to a surface of an object; and a second adhesive surface over at least a portion of the second major surface of said first backing layer, the second adhesive surface bonded to a first separable connector layer, said second separable connector layer having a major surface covering at least a portion of said second major surface of said backing layer; (B) a second adhesive structure comprising: a second backing layer having first and second major surfaces and first and second ends; an adhesive surface over at least a portion of said first major surface of said second backing layer for bonding to a surface of another object; and a cooperating separable connector surface covering at least a portion of said second major surface of said second backing layer; wherein said cooperating separable connector surface possesses the ability to be connected, disconnected and reconnected to said connection surface of said first backing layer without destruction of the separable connection surface, the cooperating connection surface and the adhesive tape; and (C) a third layer having opposing major surfaces that are capable of connecting to the first or second separable connector layers.

In some embodiments, at least one of the first and/or second adhesives are at least one of stretchable, peelable, or pressure sensitive. In some embodiments, at least one of the first or second backing layers are stretchable and/or stretch releasable.

Some embodiments include a non-adhesive manually engageable tab portion at one of said first and second ends to facilitate removal of said first backing layer. In some embodiments, the tab portion facilitates stretching of the first backing layer.

In some embodiments, said second backing layer and its adhesive surface are stretchable together to effect progressive debonding of the adhesive surface from the other object, after its adhesive surface is bonded to that object, by the application of a force to the first end of the second backing layer in a direction of extension of the second backing layer between its first and second ends. In some embodiments, the third separable connector layer includes a loop-engaging portion on at least one of its two major surfaces.

In some embodiments, the third separable connector has a thickness that is between about 0.05 and about 1.0 inches. In some embodiments, the mounting system has a thickness that is between 0.15 inches and about 5 inches. In some embodiments, the mounting system has a thickness that is greater than the thickness of an easel back or stand on a picture or photo frame.

In some embodiments, the third separable connector is attached or adhered to one of the first or second adhesive structures.

In some embodiments, the separable connector system includes at least one of a mechanical type fastener or a loop-engaging fastener material. In some embodiments, the separable connector system includes hook elements and loop elements, and at least some of the hooks elements have shape of at least one of a mushroom, a hook, a palm-tree, a nail, a T, or a J.

In some embodiments, the adhesive structures are separable so that the first separable connector layer remains with the first adhesive structure and the second separable connector layer remains with the second adhesive structure after separation.

In some embodiments, the third layer is a separable connector. In some embodiments, the third layer is a separate piece or unit. In some embodiments, the third layer is attached or adhered to one of the first or second adhesive structures.

Figure 1:
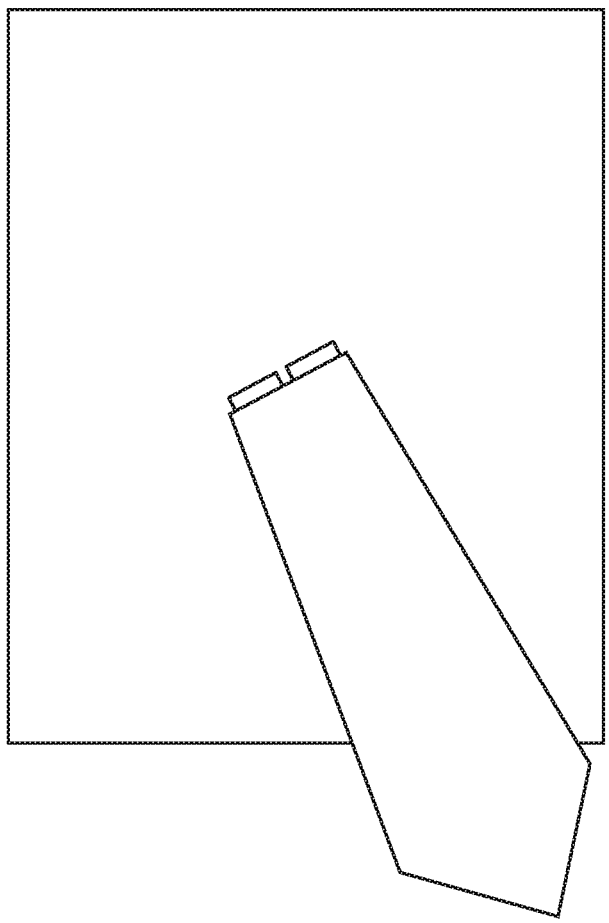
FIG. 1 is a schematic drawing of a prior art easel-back picture frame viewed from the back.
Figure 2A:
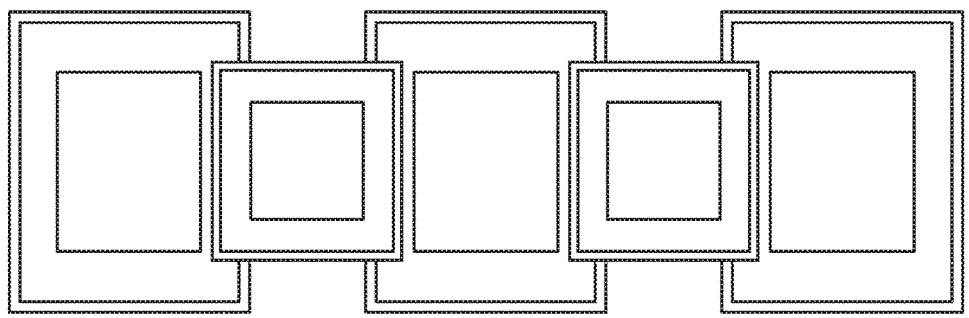
FIGS. 2a and 2b are two schematic drawings of exemplary walls including various objects hung on the wall at varying depths to permit them to overlap.
Figure 2B:
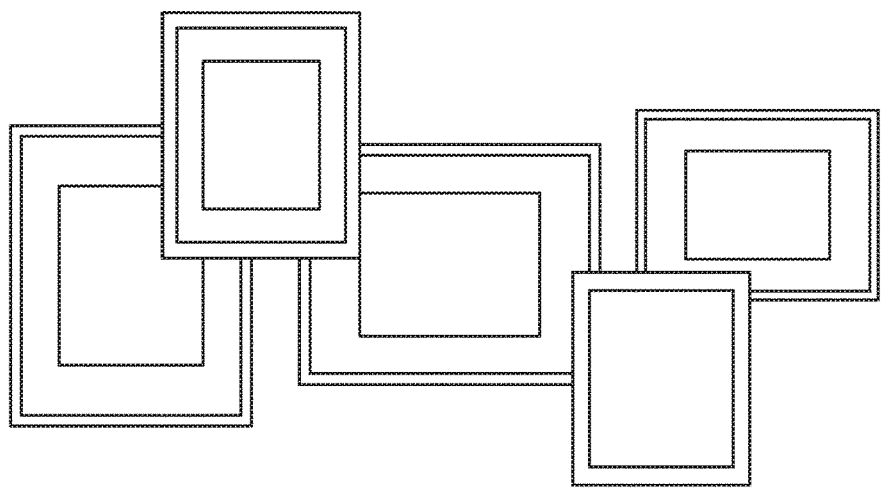

The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

DETAILED DESCRIPTION

The present disclosure will be described more fully hereinafter with reference to the accompanying drawings, in which exemplary embodiments are shown. The scope of this disclosure, however, may be embodied in many different forms and should not be construed as limited to the embodiments set forth or shown herein.

Some embodiments of the present disclosure constitute a mounting system comprising a picture hanging strip system having an increased thickness compared to a standard 3M™ COMMAND™ Picture Hanging Strip. In some embodiments, the thickness is greater than the thickness of an article, such as, for example, an easel back or stand on a picture or photo frame. In some embodiments, the thickness of the mounting system is at least 0.15 inches, 0.20 inches, 0.25 inches, 0.3 inches, 0.4 inches, 0.5 inches, 0.6 inches, 0.7 inches, 0.8 inches, 0.9 inches, 1.0 inch, 1.1 inch, 1.2 inch, 1.3 inch, 1.4 inch, 1.5 inch, 1.6 inch, 1.7 inch, 1.8 inch, 1.9 inch, 2.0 inches, 3 inches, 4 inches, or 5 inches. In some embodiments, the thickness is between about 0.15 inch and 5 inches. In some embodiments, the thickness of the mounting system is less than 5 inches, less than 4 inches, less than 3 inches, less than 2 inches, less than 1 inch, less than 0.5 inch, less than 0.4 inch, and/or less than 0.3 inch.

Picture hanging strips are described in, for example, U.S. Pat. Nos. 6,692,807 and 6,572,945, both of which are incorporated herein in their entirety. In general, picture hanging strips, as used herein, refer to an adhesive tape construction that is removable from one or more objects to which it is adhered and which is reusably separable within its construction so that an object can be separated from another and subsequently reconnected with one another. The adhesive tape construction can be used to bond the other opposed surfaces of objects, including rigid objects such as a picture frame to a wall, where no portion of the adhesive tape construction projects from between the objects, and which subsequently affords easy separation of the objects without damage to either of them.

In some embodiments, the adhesive tape construction includes a stretch release adhesive tape structure combined with a reusable connector surface. In other embodiments, the adhesive is at least one of peelable, and/or pressure sensitive. Exemplary peelable adhesives include those described in, for example, PCT Patent Publication No. 2015/195344. As used herein, the term "pressure sensitive" refers to an adhesive that is configured to be in accordance with the Dahlquist criterion for pressure sensitive tack. The Dahlquist criterion is defined as an adhesive formulation that possesses a modulus of not more than $3 \times 10^5$ Pa at 25° C. at 1 Hz (A. V. Pocius in "Adhesives and Adhesion Technology, $3^{rd}$ Ed." 2012, Hanser Publications, Cincinnati, Ohio; also referenced in U.S. Patent Applications No. 2011/0179549 and in U.S. Pat. Nos. 7,605,212, and 5,719,247). The Dahlquist criterion for pressure sensitive tack is also described as 1 sec compliance of a typical pressure-sensitive adhesive to be $10^{-6}$ cm$^2$/dyne (D. A. Satas (ed.) in "Handbook of Pressure-Sensitive Adhesive Technology" 1982, Van Nostrand Reinhold Company Inc. New York, N.Y.).

Figure 3:
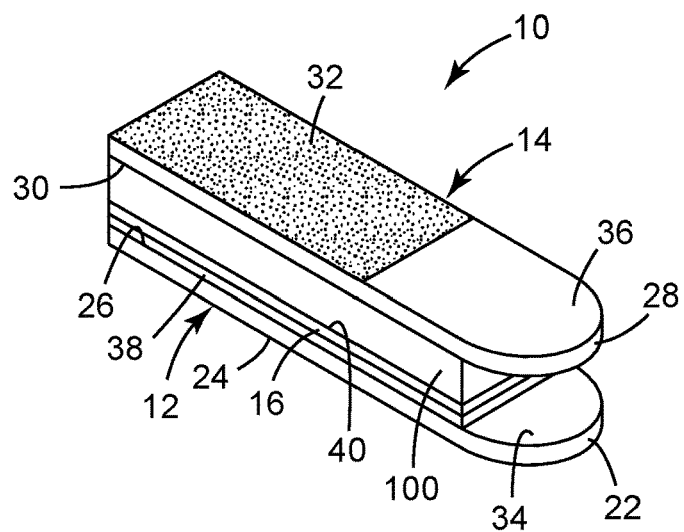
FIG. 3 is perspective view of an exemplary mounting system of the type generally described herein.
Figure 4:
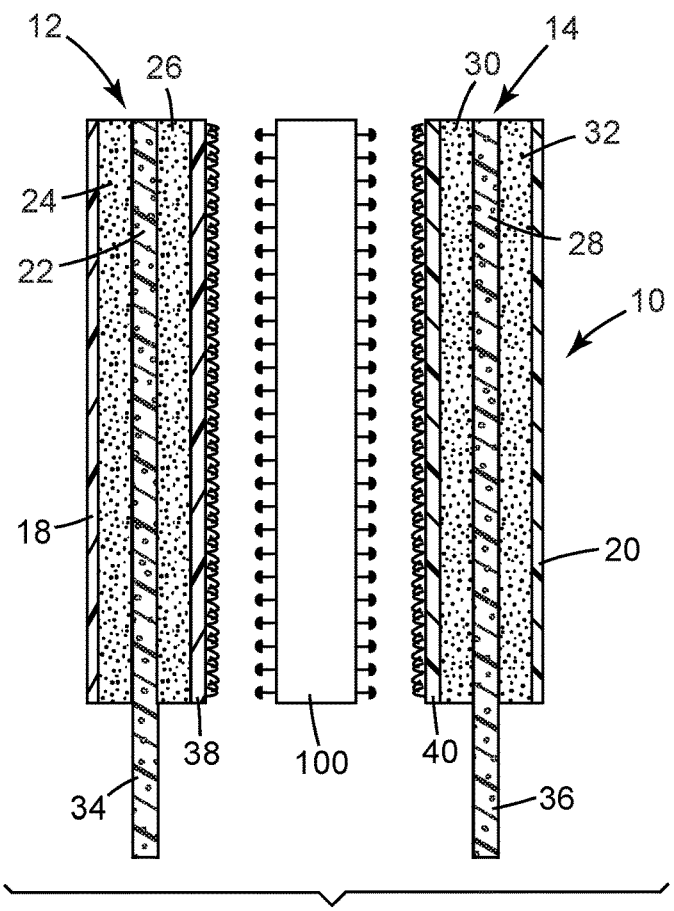
FIG. 4 is a cross-sectional side view of an exemplary mounting system of the type generally described herein.

An exemplary mounting system/picture hanging strip of the type generally described herein is shown schematically in FIGS. 3-4. Picture hanging strip/adhesive tape construction 10 includes a first stretch release adhesive tape structure 12 and a second stretch release adhesive tape structure 14 connected together by two separable connector systems 16 and 100. The first stretch release adhesive structure 12 is connected with the second stretch release adhesive tape structure 14 by separable connector system 16 and with a first liner 18 covering one side of the adhesive tape 10 and a second liner 20 covering the other side of the adhesive tape 10.

In some embodiments, the first stretch release adhesive structure 12 comprises a backing layer 22 and adhesive layers 24 and 26 of the same or different pressure-sensitive adhesive compositions on opposite major surfaces of the backing layer 22. The thicknesses of the layers of the Figures are not to scale with respect to one another. In some embodiments, second stretch release adhesive structure 14 likewise comprises a backing layer 28 and adhesive layers 30 and 32 of the same or different pressure-sensitive adhesive compositions on opposite major surfaces of the backing layer 28. In some embodiments, the external surfaces of the adhesive layers 24 and 32 of the first and second stretch release adhesive tape structures 12 and 14, respectively, are covered by the liners 18 and 20, respectively. In some embodiments, the thicknesses of one or more of the layers can be tailored for the end application. For example, the thickness of one or more of the layers can be increased to ensure that the total thickness of the mounting system is greater than the thickness of the easel back or stand.

In some embodiments, the backing layers 22 and 28, as illustrated, comprise a stretchable polymeric foam layer. In some embodiments, the backing layers 22 and 28 can alternatively comprise a stretchable polymeric film layer. The choice of polymeric foam or polymeric film depends on the specific application for the adhesive tape 10.

In some embodiments, each of the first and second stretch release adhesive tape structures 12 and 14 preferably include a tab 34 and 36, respectively. In some embodiments, tabs 34 and 36 facilitate the stretch release of each adhesive tape structure 12 and 14, respectively. Tab 34 is preferably provided as an extension of the backing layer 12. That is, the backing layer 22 extends farther longitudinally than the adhesive layers 24 or 26. Tab 36 comprises an extension of the backing layer 28 that extends farther longitudinally than the adhesive layers 30 and 32. Preferably, the adhesive layers 24, 26, 30 and 32 each cover a similar area of the backing layers 22 and 28, respectively. In some embodiments, tabs 34 and 36 can also be specifically shaped to facilitate the easy gripping thereof for the stretch release, described below. Where a solid adhesive is used, it may further be desirable to make the tab(s) non-adhesive. This can be done by any way of masking the adhesive surface or by rendering the adhesive surface non-adhesive, i.e. detackifying the adhesive surface.

In some embodiments, separable connector system 16 preferably comprises a first connector component 38 and a second connector component 40. In some embodiments, the first connector component 38 is bonded to the first stretch release adhesive tape structure 12 by the surface of adhesive layer 26. In some embodiments, the second connector component 40 is bonded to the second stretch release adhesive tape structure 14 by the surface of adhesive layer 30. In some embodiments, the first and second connector components 38 and 40 are preferably co-extensive with and cover the similar areas as the adhesive layers 24, 26, 30 and 32.

In some embodiments, the separable connector system 16 or 100 can comprise any known or developed reusable connector system for connecting the first and second stretch release adhesive tape structures 12 and 14 together. Preferably, the separable connector system 16 permits the reusable separation and connection of the stretch release adhesive tape structures 12 and 14 along a general plane. The connector system 16 may comprise, for example, mechanical type fasteners, including interlocking systems, intermeshing systems (having connection without macroscopic mechanical deformation or interference), releasable contact responsive fasteners, and the like. In some embodiments, the stretch release adhesive tape structures 12 and 14 are separable so that the first connector component 38 remains with the first stretch release adhesive tape structure 12 and the second connector component 40 remains with the second stretch release adhesive tape structure 14 after separation of the connector system 16.

Separable connector system 100 can be any separable connector system, including, for example a loop-engaging fastener material. Generally, hook elements with loop-engaging heads have a head shape that is different from the shape of the stem. As used herein, the term "loop-engaging" relates to the ability of a hook element to be mechanically attached to a loop material. For example, the hook element may be in the shape of a mushroom (e.g., with a circular or oval head enlarged with respect to the stem), a hook, a palm-tree, a nail, a T, or a J. The loop-engageability of hook elements may be determined and defined by using standard woven, nonwoven, or knit materials. One exemplary commercially available loop-engaging material is 3M™ Dual-Lock™ fastener. Any loop-engaging material, apparatus, device, method of making, or method of use described in any of the following references (all of which are incorporated herein in their entirety) can be used in any of the embodiments described herein: U.S. Pat. Nos. 8,777,919; 4,699, 622; 4,894,060; 5,077,870; 5,312,387; 5,344,691; 5,399, 219; 5,487,809; 5,537,722; 5,554,146; 5,705,013; 5,759, 317; 5,851,205; 5,957,908; 5,985,081; 6,030,373; 6,051, 094; 6,075,179; 6,190,758; 6,406,468; 6,544,245; 6,575, 953; 7,032,278; 7,125,400; 7,361,246; 7,371,302; 7,517, 572; 7,578,812; 7,658,813; 3,471,903; 4,120,718; 4,223, 067; 4,216,257; 4,391,687; 4,322,875; 4,415,615; 4,454, 183; 4,563,388; 3,353,663; 3,408,705; 4,977,003; 4,679, 851; 4,819,309; 4,776,636; 5,308,428; 5,135,598; 4,910, 062; 4,887,339; 4,985,488; 5,679,302; 4,894,060; 5,145, 929; 5,908,695; 5,024,880; 5,852,855; 5,040,275; 5,149, 573; 4,290,832; 5,453,319; 5,614,232; 5,691,027; 5,713, 111; 5,671,512; 5,625,929; 5,671,511; 5,851,663; 5,654, 487; 5,602,221; 5,598,610; 5,691,021; 7,879,441; 8,277, 922; 6,470,540; 6,076,238; 6,592,800; 6,630,239; 6,588, 074; 7,217,455; 7,703,179; 6,874,777; 7,140,774; and US Patent Publication No. 2004/0010217.

In some embodiments, the area of connection and the type of the separable connector system 16 or 100 is preferably selected so that the force required to separate the adhesive tape 10 into the first and second stretch release adhesive tape structures 12 and 14 can be readily applied by a user. Such a force may be applied in a direction substantially perpendicular to the general plane of the connector system, or as a peeling force, a cleavage force, combinations thereof or other release mechanisms. The type of force applied depends largely on the objects that are bonded together. With very flexible materials, a peeling force would likely be a primary force utilized for releasing the separable connector system 16. With rigid materials, a cleavage force may be mostly applied; that is where a person would pull from the bottom edge of the frame (causing angular displacement) to release the separable connector system 16 and/or 100 of the adhesive tape 10 located at the top. If the frame were pulled to release in a perpendicular direction, a perpendicular force is applied. Moreover, the connector system 16 or 100 should provide sufficient strength along the general plane of its separation so that, depending on the specific application, the separable connector system 16 or 100 will not separate based on the use of the adhesive tape 10 between plural objects. In the case of an object such as a picture frame mounted to a vertical wall surface, the connector system 16 or 100 should be of sufficient strength in the direction of its general plane of separation so that the picture frame will not shift downward during application or over time. The separable connector system 16 or 100 provides an internal static shear strength in a direction parallel to the surfaces of the adhesive layers 24 and 32 for supporting the objects between which the adhesive tape 10 is attached in that direction. That is, the shear strength of the connector system 16 or 100 preferably equals or exceeds the highest shear force that the pressure sensitive adhesive can develop with surfaces to which it is applied (e.g., about six pounds per square inch (0.041 MPa)).

Figure 5:
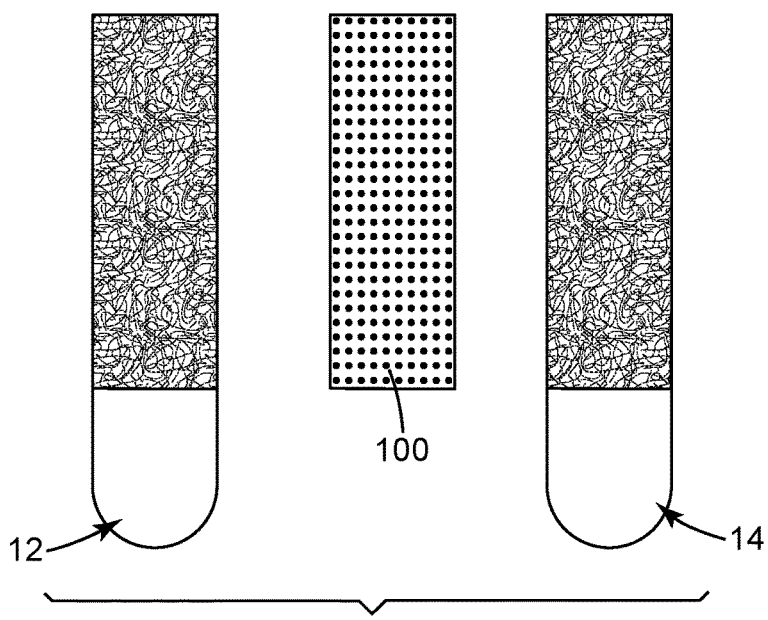
FIG. 5 is a schematic drawing of a front view of the mounting system of FIG. 4 shown in cross-section.
Figure 6A:
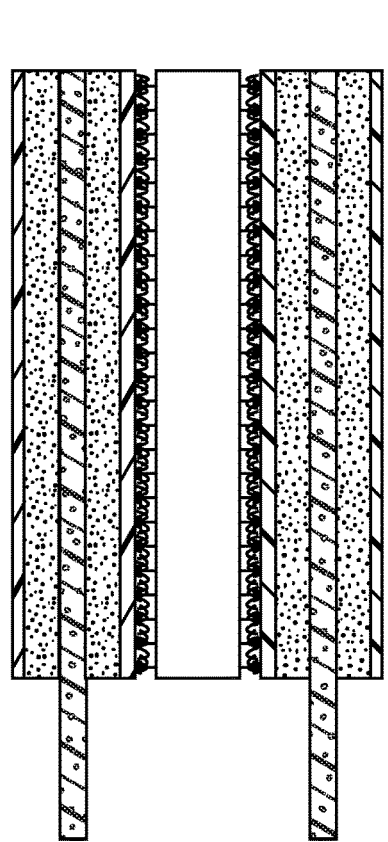
FIG. 6A is a schematic side view of an exemplary mounting system of the type described herein
Figure 6B:
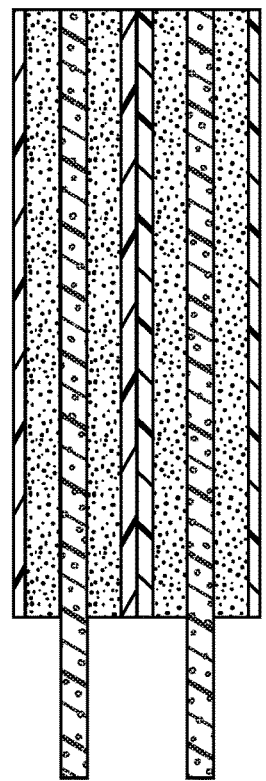
FIG. 6B is a schematic side view of a prior art picture hanging strip.

FIG. 5 shows a photographic front view of the mounting system shown in cross-section in FIG. 4. FIG. 6A schematically shows mounting system 10. FIG. 6B schematically shows a prior art picture hanging strip in cross-section.

Figure 7:
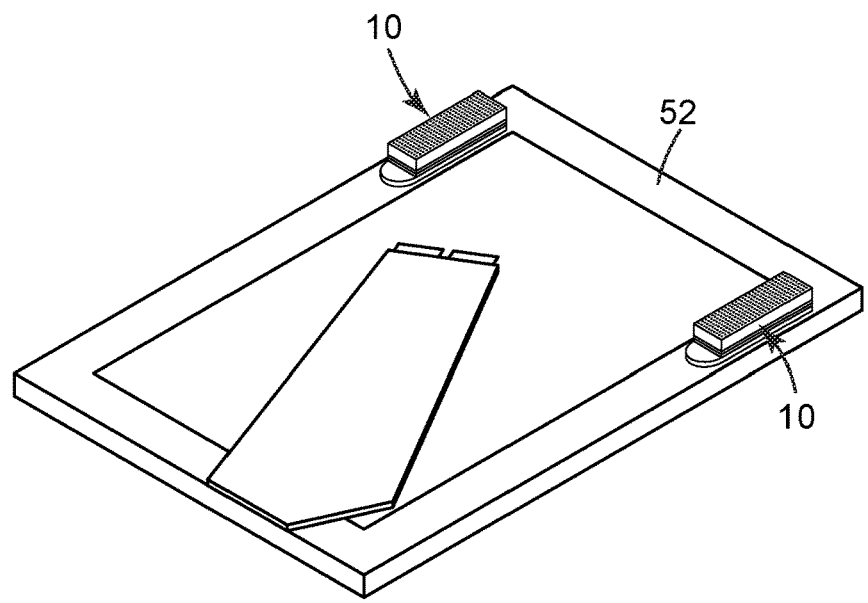
FIG. 7 is a schematic drawings of the back side of a picture or photo frame to which has been applied at least a portion of the mounting system generally described herein.
Figure 8:
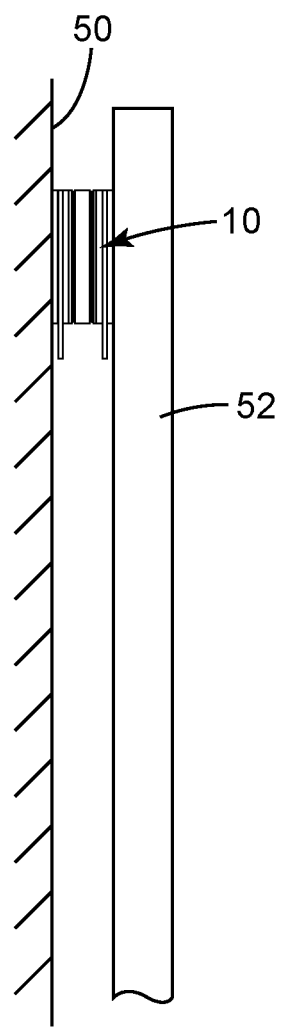
FIG. 8 is a schematic side view of a picture or photo frame attached and/or adhered to a wall using a mounting system of the general type described herein.

As shown schematically in FIGS. 7 and 8, adhesive tape 10 can be positioned between a first object 50 (a wall) and a second object 52 (a picture frame) without any portion of the adhesive tape 10 extending out from in between the first and second objects 50 and 52. The picture frame can be connected by a single adhesive tape 10 positioned to provide a balanced support to the wall; however, any number of adhesive tapes 10 can be used (for example, two mounting systems of the type described herein are used in FIGS. 7 and 8). Moreover, the ability to reposition the objects together is facilitated to allow for accurate alignment and balanced positioning.

The recitation of all numerical ranges by endpoint is meant to include all numbers subsumed within the range (i.e., the range 1 to 10 includes, for example, 1, 1.5, 3.33, and 10).

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

All references mentioned herein are hereby incorporated by reference in their entirety.

It is understood that connector systems may have many different properties that make them particularly suitable for certain applications or for connecting certain types of objects together. Thus, in accordance with the present invention, any such connector system can be used, but the chosen connector system can be advantageously picked based upon its properties that make it particularly suitable for a specific application or for connecting certain types of objects together.

Those having skill in the art will appreciate that many changes may be made to the details of the above-described embodiments and implementations without departing from the underlying principles thereof. Further, various modifications and alterations of the present disclosure will become apparent to those skilled in the art without departing from the spirit and scope of the disclosure. The scope of the present disclosure should, therefore, be determined only by the following claims.

What is claimed is:

1. A mounting system, comprising:
a first adhesive structure comprising:
a first backing layer having first and second major surfaces and first and second ends;
a first adhesive layer over at least a portion of said first major surface for bonding to a surface of an object and a second adhesive layer over a least a portion of the second major surface;
wherein the second major surface of said first backing layer bonded to a first separable connector component via a surface of the second adhesive layer, said first separable connector component having a major surface covering at least a portion of said second major surface of said first backing layer, and wherein said first backing layer and its adhesive layers are stretchable together to effect progressive debonding of the adhesive from a first object, after its adhesive surface is bonded to that object, by the application of a force to the first end of the first backing layer in a direction of extension of the first backing layer between its first and second ends and away from the second end;
a second adhesive structure comprising:
a second backing layer having first and second major surfaces and first and second ends;
a first adhesive layer over at least a portion of said first major surface of said second backing layer for bonding to a surface of another object; and
a second separable connector component having a second separable connector surface covering at least a portion of said second major surface of said second backing layer; and
a monolithic third layer having a first major surface having a third separable connector component capable of releasably connecting to the first separable connector component, and a second major surface having a fourth separable connector component capable of releasably connecting to the second separable connector surface, wherein, when the system is assembled, the third layer is disposed between the first and second adhesive structures.

2. The mounting system of claim 1, wherein at least one of the third and fourth separable connector components includes a loop-engaging portion on at least one of its two major surfaces.

3. The mounting system of claim 1, wherein the third layer has a thickness that is between about 0.05 and about 1.0 inches.

4. The mounting system of claim 1, wherein the mounting system has a thickness that is between 0.15 inches and about 5 inches.

5. The mounting system of claim 1, wherein the mounting system has a thickness that is greater than the thickness of an easel back or stand on a picture or photo frame.

6. The mounting system of claim 1, wherein the second backing layer of the second adhesive construction includes a second adhesive layer over a least a portion of the second major surface and wherein the second major surface of said second backing layer is bonded to the second separable connector component layer via a surface of the second adhesive layer of the second adhesive structure.

7. The mounting system of claim 6, wherein the second adhesive structure is stretch releasable, and wherein said second backing layer and its adhesive layers are stretchable together to effect progressive debonding of the adhesive from a second object, after its adhesive surface is bonded to that second object, by the application of a force to the first end of the second backing layer in a direction of extension of the second backing layer between its first and second ends.

8. The mounting system of claim 1, further including:
a non-adhesive manually engageable tab portion at one of said first and second ends to facilitate removal of said first backing layer.

9. The mounting system of claim 8, wherein the tab portion facilitates stretching of the first backing layer.

10. The mounting system of claim 1, wherein at least one of the first and second adhesive structures include pressure sensitive adhesives.

11. The mounting system of claim 1, wherein the first separable connector component of the first adhesive structure and the third separable connector component of the third layer define a first separable connector system, wherein the second separable connector component of the second adhesive structure and the fourth separable connector component of the third layer define a second separable connector system, and wherein each of the first and second separable connector systems includes at least one of a mechanical type fastener or a loop-engaging fastener material.

12. The mounting system of claim 11, wherein at least one of the first and second separable connector systems includes hook elements and loop elements, and at least some of the hooks elements have shape of at least one of a mushroom, a hook, a palm-tree, a nail, a T, or a J.

13. The mounting system of claim 1, wherein the adhesive structures are separable from the third layer so that the first separable connector component remains with the first adhesive structure and the second separable connector component remains with the second adhesive structure after separation.

14. The mounting system of claim 1, wherein the third and fourth separable connector components on the third layer each include hook elements.

15. The mounting system of claim 1, wherein the third layer includes a loop-engaging portion on both of its two major surfaces.

16. The mounting system of claim 1, wherein said second separable connector component possesses the ability to be connected, disconnected and reconnected to said fourth separable connector component without destruction of at least one of; a) the second and fourth separable connection layer connection surfaces, and b) the first and second adhesive layers on the second backing layer.

17. The mounting system of claim 16, wherein said first separable connector component possesses the ability to be connected, disconnected and reconnected to said third separable connector component without destruction of at least one of; a) the first and third separable connection layer connection surfaces, and b) the first and second adhesive layers on the second backing layer.

18. The mounting system of claim 1, wherein the second adhesive construction is stretch releasable, and wherein the second backing layer comprises at least one of a stretchable film layer or stretchable foam layer.

* * * * *

UNITED STATES PATENT AND TRADEMARK OFFICE
CERTIFICATE OF CORRECTION

PATENT NO. : 10,259,194 B2  
APPLICATION NO. : 15/559154  
DATED : April 16, 2019  
INVENTOR(S) : Christina Cowman-Eggert Page 1 of 1

It is certified that error appears in the above-identified patent and that said Letters Patent is hereby corrected as shown below:

In the Specification

Column 3, Line 29, delete "herein" and insert -- herein. --

In the Claims

Column 7, Line 58, delete "a" and insert -- at --

Column 8, Line 40, delete "a" and insert -- at --

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*